Patented July 28, 1925.

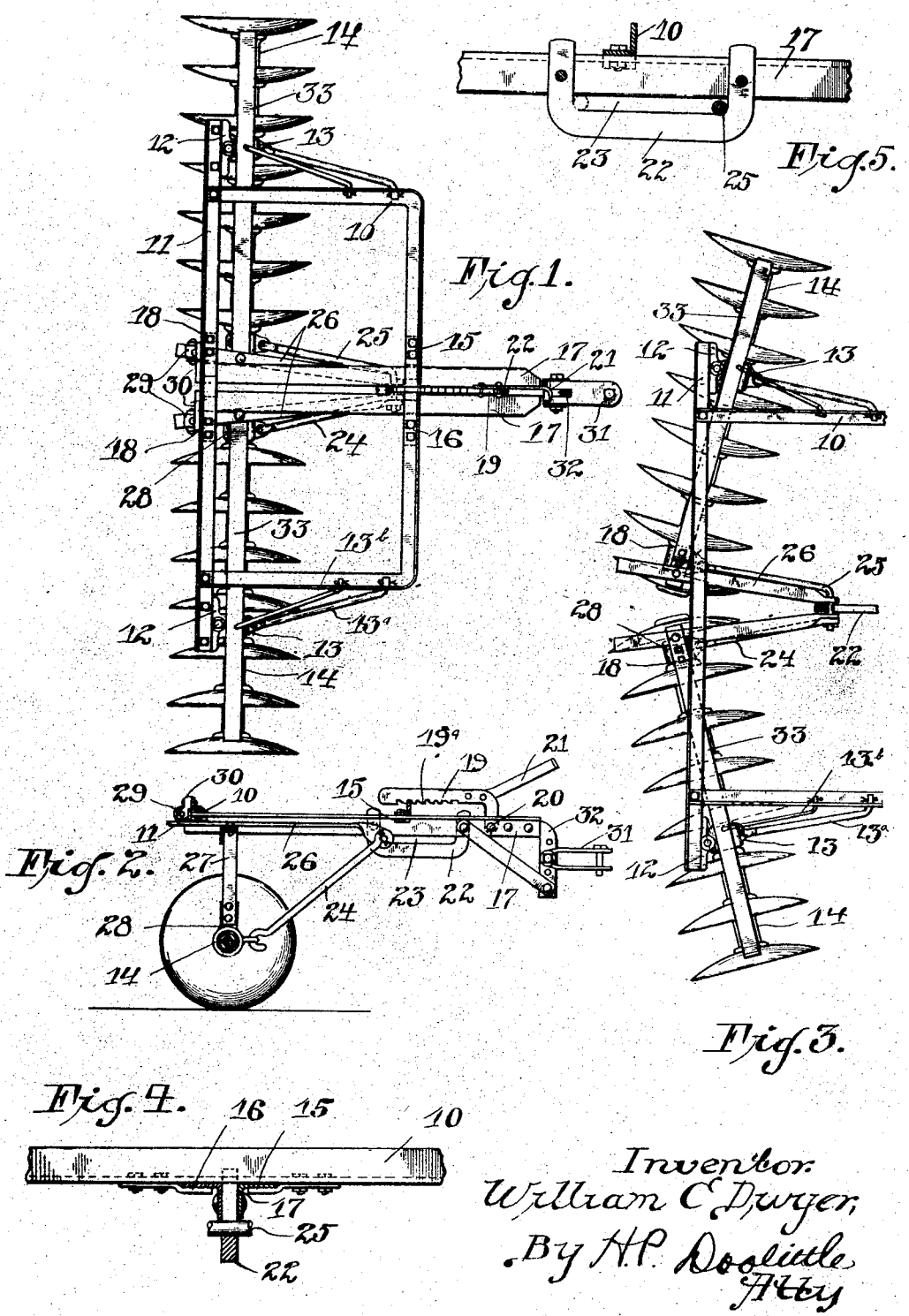

1,547,796

UNITED STATES PATENT OFFICE.

WILLIAM C. DWYER, OF AUBURN, NEW YORK, ASSIGNOR TO INTERNATIONAL HARVESTER COMPANY, A CORPORATION OF NEW JERSEY.

TRACTOR DISK HARROW.

Application filed June 29, 1921. Serial No. 481,226.

*To all whom it may concern:*

Be it known that I, WILLIAM C. DWYER, a citizen of the United States, residing at Auburn, in the county of Cayuga and State of New York, have invented certain new and useful Improvements in Tractor Disk Harrows, of which the following is a full, clear, and exact specification.

This invention relates to harrows, particularly those designed to be drawn by tractors.

It is an object of this invention to provide a harrow which can be angled or straightened by the movement of the draft power. Another object is to provide a harrow possessing a high degree of flexibility. As harrows of a type to be drawn by tractors are quite large and have a wide reach, any unevenness in the ground will affect them more than would be the case with the smaller types which are drawn by horses.

These and other objects, as will appear from the following specification, are accomplished by my invention which comprises a harrow having a frame, disk gangs thereon, means for angling said gangs, bearing means between the inner ends of said gangs and said frame limiting the upward swing of said gangs, the gangs being free to swing down to follow the undulations of the ground.

Referring now to the drawings,

Fig. 1 is a plan view of my invention as applied to a single unit harrow shown in a straightened position;

Fig. 2 is a vertical longitudinal section near the center line of Fig. 1;

Fig. 3 is a partial view similar to Fig. 1 with the harrow disk gangs angled;

Figs. 4 and 5 are fragmentary details of the harrow frame.

I have illustrated my invention in connection with a single section harrow having a frame made up of a U-shaped member 10 which is bolted to a rear bar 11. This rear bar carries brackets 12 which in turn carry bearings 13 which are hingedly mounted thereon and have journaled therein the disk gang shafts 14. The bearings 13 are further supported from the main frame member 10 by means of brace rods 13ª pivotally attached to the bearing and rods 13ᵇ pivotally attached to the disk gang frame 33 at a point immediately over the bearing 13.

Near the center of the U-shaped member 10 and on its under side are secured clips 15 and 16 which slidably receive the draft frame or tongue composed, in this instance, of a pair of angle bars 17. These draft angles are also arranged to slide through similar clips 18 attached to the under side of the rear members 11. A latch 19 is hingedly connected to the two draft angles 17 at 20. This latch has a series of teeth 19ª which are adapted to engage the vertical flange of the U-shaped angle member 10 and thereby act as a means for locking the draft angles 17 in an adjusted position to the harrow frame. Preferably the teeth 19ª are formed to lock on forward movement of the draft tongue and to ride over the bar 10 on backward movement. A means for operating this latch from the tractor is provided such as the foot lever 21 attached thereto.

U-shaped guide 22 is secured between the draft angles 17 in such a way as to form a slot 23. Connection is made between the inner ends of the gangs 14 and the draft angles 17 by means of connecting links 24 and 25, the latter of which is preferably bent so as to pass through and be slidable in the slot 23. Carried by this same bent member 25 are two pressure bars 26 which are also hingedly connected to the inner ends of the gang frames 33. These frames have uprights 27 which are secured to the inner ends of the disk gangs through the bearings 28, as shown in Fig. 2. The bars 26 extend back and bear upon rollers 29 which are mounted by means of brackets 30 on the rear frame member 11.

An adjustable clevis 31 carried by member 32 which is secured to the draft angle 17 is shown for attachment to a tractor.

It will be seen from Fig. 2 that when the gangs are straight and the tractor is backed, the draft angles 17 will automatically slide back across the frame members 10 and 11 because of the ratchet action of the latch 19, but because of the slot 23 no thrust will be given the inner ends of the gangs through the links 24 and 25 by the backing action. Consequently the harrow gangs will remain straight during the backing action.

As the harrow is drawn forward, however, the action of the ground upon the inner end of the disk gangs will tend to angle the gangs as shown in Fig. 3, and the inner ends of the gangs will then drop back until the bent end of the link 25 strikes the rear end of the slot 23, as shown in Fig. 3. It will be seen from this that the amount of the angle of the disk gangs depends upon the setting of the latch 19 with respect to the U-shaped member 10. If, as the harrow is drawn forward, it is seen that the angle is too great it can be straightened by raising latch 19 by the foot lever 21 allowing the frame to engage in another notch.

It will be seen, therefore, that the angle of the gangs is set during the operation of backing, while the gangs themselves during this operation are maintained in a straightened position, and that on the forward pull the gangs are made to assume the angle so set. It will also be observed that no means is provided for holding the inner ends of the disk gangs up against the guides, as in an out-throw harrow no such means is required, as the tendency of the inner ends of the gangs is to raise. Rollers 29 are provided, however, to take the upward thrust of the inner ends of the disk gangs. When the draft tongue is drawn forward to straighten the gangs, the latch 19 is lifted, allowing it to slide forward in the frame, carrying with it the U-shaped guide 22, and as the bent member 25 is at the rear of the slot 23 the gangs are pulled forward, thereby straightening the gangs.

Because of my method of mounting these gangs on the main frame as well as their attachment to the draft means, I have provided a disk harrow of unusual flexibility which permits it to readily adapt itself to any unevenness in the soil in which it is operating.

While I have in the above specification described certain specific embodiments of my invention, it should be understood that I do not intend to limit myself to the particular constructions illustrated, but that modifications and changes may be made without departing from the spirit and scope of the invention as expressed by the following claims:

1. In a harrow, a main frame, including a transverse member having a vertical flange, disk gangs hingedly mounted thereon, a draft frame slidably mounted on said main frame and passing beneath said transverse member, angling connections between said draft frame and the disk gangs, and a ratchet bar pivoted at one end on the draft frame and positioned for engagement with said vertical flange.

2. In a harrow, a main frame including a transverse member having a vertical flange, disk gangs hingedly mounted thereon, a draft frame slidably mounted on said main frame and passing beneath said transverse member, angling connections between said draft frame and said disk gangs, comprising links connected to the inner ends of the gangs and having a lost motion connection with said draft frame, and a ratchet bar pivoted at one end on the draft frame and positioned for engagement with said vertical flange.

3. In a harrow, a main frame including front and rear transverse members, the front member having a vertical flange, disk gangs hingedly mounted on the frame, a draft frame slidably mounted beneath said members, angling links connecting said draft frame with the disk gangs, pressure bars pivotally connected to said draft frame and gangs and engaged beneath said rear frame member, and a ratchet bar pivoted at one end on said draft frame and positioned for engagement with said vertical flange.

4. In a harrow, a main frame including a plurality of transverse bars, disk gangs hingedly mounted on said frame, a draft frame slidably mounted beneath said bars, angling connections between said draft frame and the gangs, pressure bars connected to said draft frame and gangs and movable in engagement with one of said bars, and adjustable gang locking means mounted on said draft frame comprising a latch bar pivoted on the draft frame and cooperating with another of said transverse bars to hold the gangs in desired position.

5. In a harrow, a main frame, a disk gang hingedly mounted thereon, a draft frame slidable back and forth across said main frame, an angling connection between said draft frame and the disk gang, and an adjustable gang locking means comprising a ratchet bar pivoted at one end on the draft frame and having its toothed edge traveling over a flanged element on the main frame and adapted to permit free movement of the draft frame in one direction.

In testimony whereof I affix my signature.

WILLIAM C. DWYER.